INVENTOR.
SIGMUND N. PORTER

INVENTOR.
SIGMUND N. PORTER

United States Patent Office 3,419,815
Patented Dec. 31, 1968

3,419,815
SIGNAL GENERATORS WITH RAPID AUTOMATIC AMPLITUDE STABILIZATION

Sigmund N. Porter, P.O. Box 66188, Los Angeles, Calif. 90066

Filed Mar. 20, 1967, Ser. No. 624,321
14 Claims. (Cl. 331—40)

ABSTRACT OF THE DISCLOSURE

An amplitude stabilized signal generator in which the stabilization may be more rapid than the period of oscillation, and in which the initial phase may be preset is disclosed. An amplitude signal reporting the amplitude of the output signal is generated simultaneously with the output signal, and used for negative feedback control.

The present invention relates to a method and apparatus for amplitude stabilization of signal generators and, more particularly, to such a stabilization method and apparatus for simultaneously generating an output signal and an amplitude signal which reports and controls the amplitude of the output signal. As used herein, the term "signal generator" is understood to include oscillators, function generators and the like.

Signal generators in the prior art have been deficient in one or more particulars: among the more serious deficiencies output signals have not been stabilized in amplitude, complicated networks with many adjustments were required to generate the desired waveform from a more easily generated waveform, the amplitude of the output signal was detected at only one or two instants in each cycle, and a function of the output signal was averaged in a slowly reacting apparatus. In the latter two cases, the results included a significant delay in the stabilization of the output signal.

The present invention avoids these difficulties by generating, at the same time as the desired output signal is generated, an amplitude signal, by means of which the amplitude of the output signal may be known at frequent intervals or continuously throughout the cycle of the output signal. By taking advantage of the mathematical properties of the waveform of the output signal, the invention includes an oscillation means which inherently generates both the output and amplitude signals simultaneously. The amplitude signal is negatively fed back to the oscillation means to stabilize the amplitude of the output signal.

An object of the present invention is to permit oscillation to commence without any sensible transient.

A further object is to permit oscillation to start at any desired phase. The above objects are particularly valuable at low frequencies, when it becomes inconvenient to wait for either stabilization or a particular phase.

A further object is to avoid requiring a multiplicity of adjustments.

Figure 1:
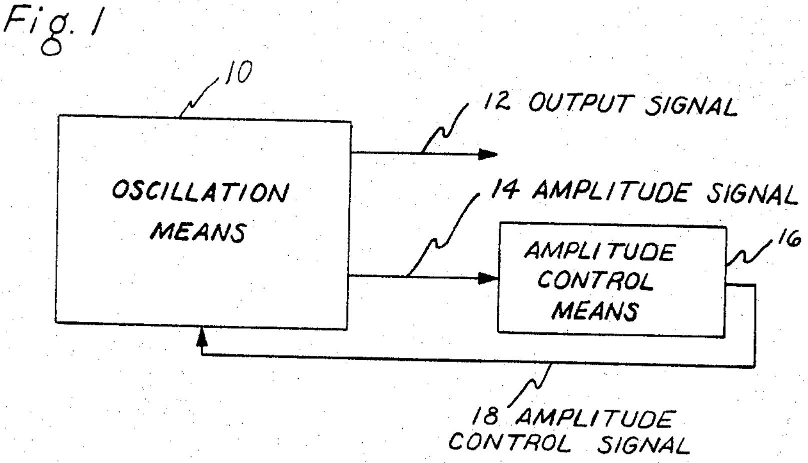
Figure 3:
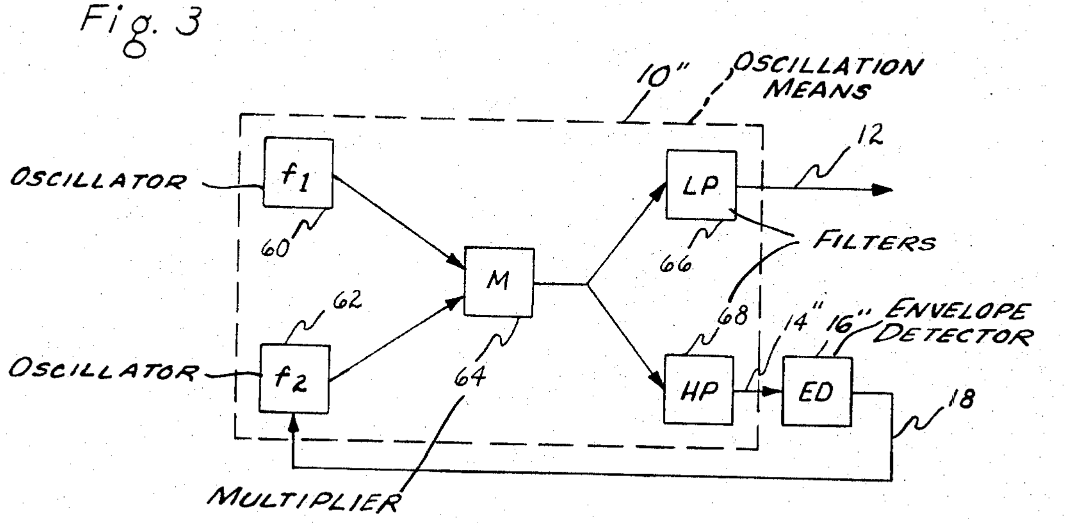
Figure 2:
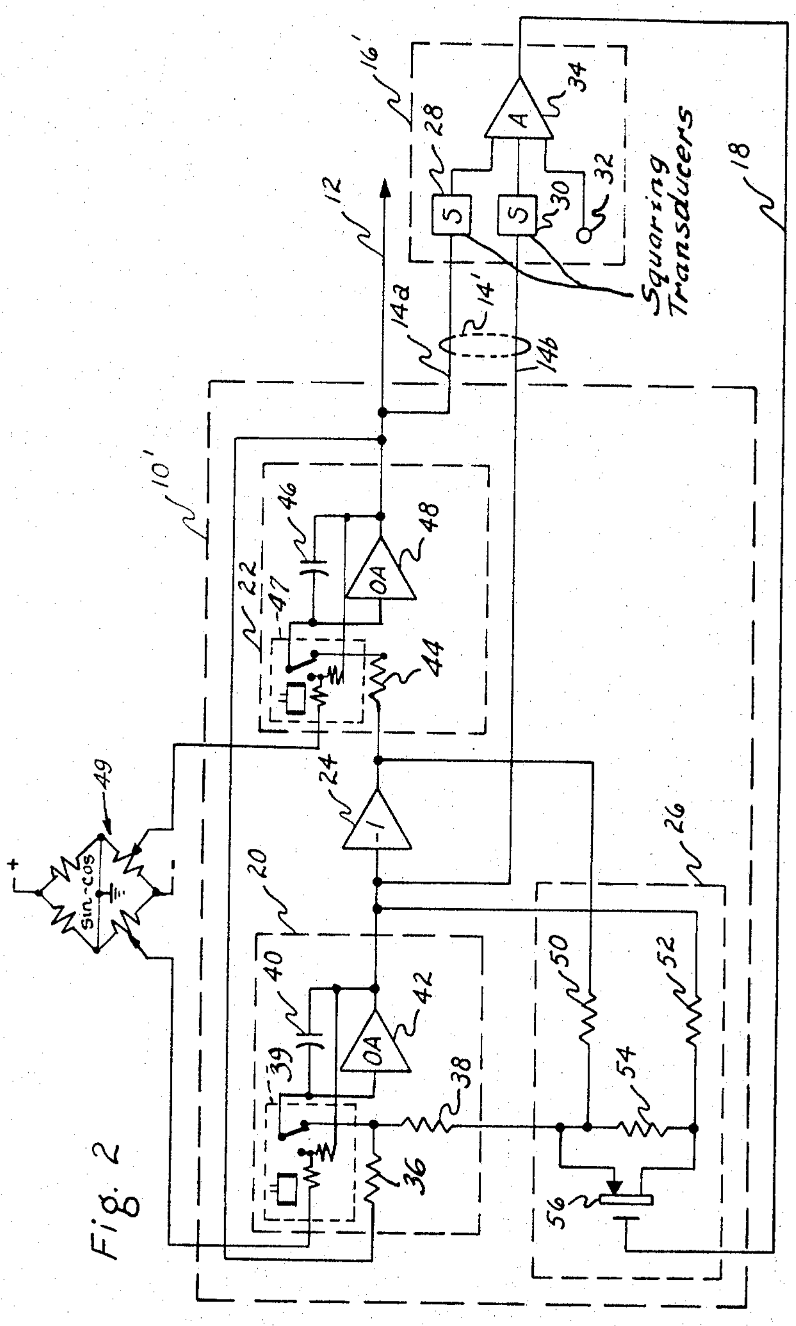

These and other objects as well as a more complete understanding of the present invention will become more apparent from the following description of exemplary embodiments and the accompanying drawings thereof, in which:

FIG. 1 shows a block diagram generally illustrating the invention;

FIG. 2 shows a first embodiment of the invention in which an oscillation means generates an amplitude signal having two sinusoidal components which are ninety degrees out of phase and in which the amplitude of the output signal is continuously tested and reported by summing the squares of these components; and FIG. 3 shows a second embodiment of the invention in which the output signal is generated by heterodyning two higher frequency signals and in which the amplitude signal is the high frequency byproduct of the heterodyning process.

FIG. 1 shows a block diagram of the invention having oscillation means 10 for producing output signal 12 and amplitude signal 14. The amplitude signal is conveyed to amplitude control means 16 which produces amplitude control signal 18. The amplitude control signal is negatively fed back to the oscillation means.

The invention functions as follows: oscillation means 10 simultaneously generates output signal 12 and amplitude signal 14. The amplitude signal is designed to report the amplitude of the output signal so frequently that the negative feedback loop comprising oscillation means 10, amplitude signal 14, amplitude control means 16, and amplitude control signal 18 is able to stabilize more rapidly that the period corresponding to the frequency of output signal 12.

The term "signal" is here understood to include signals having a plurality of components, where each component is a conventional single-component signal. A multi-component signal may be most simply conveyed using a separate wire or other signal conveyance means for each component, however, it is to be noted that such a multi-component signal may also be conveyed in other ways. Further, a multiplicity of signals may be conveyed on a single wire or other signal conveyance means as long as the signals are separable by some means.

The amplitude of a periodic single-component signal is conventionally defined to be the absolute value of the extreme value reached by the signal. This definition may be strictly applied only to signal components with constant amplitude. In order to define the amplitude of a given signal component with varying amplitude, we regard the given component as the multiplicative product of two other signal components: the first being periodic and essentially having the same frequency and waveform as the given component, and the second having an instantaneous value which is equal to the ratio of the instantaneous values of the given component and the first component. The amplitude of the given component at any instant is then the absolute value of the product of the extreme value reached by the first component and the value of the second component at that instant. Note that the amplitude of a signal of specified frequency may vary more rapidly than the period corresponding to the specified frequency. The amplitude of a multi-component signal is here defined to be the largest of the amplitudes of the components of that signal.

As stated above, the negative feedback loop is able to stabilize more rapidly than the period corresponding to the frequency of the output signal. Here, two separate types of stabilization time must be recognized: the first relates to the time required for the signal to reach its desired amplitude, given that for some reason it is not at the desired amplitude. Stabilization of the second type relates to the time required for the signals in the negative feedback loop to reach steady values, given that the output signal suddenly reaches its desired amplitude from a previously disturbed amplitude. Parameter values for the present invention can be chosen so that both stabilization times are small with respect to the period of oscillation of the output signal; however, given that a presetting mechanism is used to initially set the amplitude of the output signal at its desired value, circuit design simplifications may occur if the first type of stabilization is slower than would otherwise be required. In the present invention, the first type of stabilization can be made slow while the second type remains rapid.

FIG. 2 shows a first embodiment of the invention shown in FIG. 1, in which oscillation means 10' comprises summing and integration means 20 which is presettable to a specified initial condition, integration means 22 which is presettable to a specified initial condition, unity gain inverting amplifier 24, and damping control means 26. Amplitude control means 16' comprises squaring and summing means; although these functions may be combined, they are here shown as squaring transducers 28 and 30, having an output current which is proportional to the applied voltage, reference signal (which may have zero value) 32, and moderate gain summing amplifier 34. The amplitude signal 14', has two components, **14*a* and 14*b*, which are outputs from integrators 22 and 20, respectively. Integration and summing means 20 comprises summing resistors 36 and 38, capacitor 40, initial condition presetting means 39, and operational amplifier 42. Integration means 22 comprises resistor 44, capacitor 46, initial condition presetting means 47, and operational amplifier 48. Several types and varieties of initial condition presetting means are well known in the analog computer art. Most conveniently, the source of initial condition values for initial condition presetting means is sin-cos potentiometer 49. Damping control means 26 comprises resistors 50, 52, and 54 and p-channel MOS field effect transistor 56. Preferably, but not necessarily, resistors 36 and 44 have equal values and capacitors 40 and 46** have equal values.

In the embodiment shown in FIG. 2, integrators 20 and 22 together with inverter 24, as is well known in the analog computer art, generate two signal components of the form $k \sin at$ and $k \cos at$ (which are **14*a* and 14*b*) which form amplitude signal 14', wherein $t$ is time, $a$ is angular frequency, and $k$ is amplitude. One of these components is also used as output signal 12. Since circuit elements are not ideal, the amplitude, $k$, would gradually increase or decrease with time; however, damping control means 26 is used to control this increase or decerase and cause $k$ to stabilize at the desired value. Resistors 52 and 54 sufficiently reduce the voltage applied to transistor 56 so that transistor 56 approximates the action of a resistor, the resistance of which is determined by amplitude control signal 18. Resistor 50 supplies positive feedback to integrator 20, tending to increase amplitude $k$. Resistors 52 and 54, in combination with transistor 56**, supply negative feedback which tends to reduce $k$.

The sine and cosine components of the amplitude signal are squared by squaring transducers 28 and 30, respectively, and summed with the reference signal 32. The output of amplifier 34, which is the amplitude control signal 18, is thus $(k^2 \sin^2 at + k^2 \cos^2 at - R)A$, where R is the value of the reference and A is the gain (which in this example is negative) of amplifier 34. By the well known trigonometric identity $\sin^2 x + \cos^2 x = 1$, the amplitude control signal is equal to $(k^2 - R)A$. Hence, the amplitude control signal is independent of the phase of the output signal. If the amplitude, $k$, becomes too large, then (for negative A) the amplitude control signal, 18, $(k^2 - R)A$, becomes more negative. This, in turn, makes transistor 56 more conductive, thus increasing the negative feedback and reducing $k$ to the desired value. The opposite control action occurs if $k$ becomes too small. Resistor 38 serves to reduce such distortion as may occur if circuit elements are not perfect, by increasing the time required for stabilization of the first type. Time for stabilization of the second type may still be considerably less than a cycle of the output signal. Resistor 38 is not required, and the distortion reduction, if necessary, could also be accomplished by increasing the values of the resistors in the damping control means.

Since the amplitude signal is independent of phase, one may choose circuit element values (such as the values of resistors 38, 50, 52 and 54) so that amplitude stabilization of the first type occurs in a time considerably less than the period of oscillation. Since integrators 20 and 22 are presettable to a desired initial condition, the oscillator will start at any desired phase, and at the desired amplitude. For this reason no disadvantage results from slow stabiliation of the first type. Most conveniently, the initial conditions are derived from a sin-cos potentiometer.

Many variations are, of course, possible. Amplitude control feedback may be applied at both integrators. In addition, the integrators may be implemented with liquid state devices. Other devices may be used for the variable feedback element such as n-channel MOS, and photoconductors. Most of these and other variations will require some changes in the circuit configuration, however such changes will be obvious to those skilled in the art in light of the present invention.

FIG. 3 shows a second embodiment of the invention shown in FIG. 1, in which oscillation means 10'' comprises oscillator 60 (which may be conventional in design), for producing a sinusoidal signal of frequency $f_1$; second oscillator 62 (which may be conventional in design) for producing a sinusoidal signal of frequency $f_2$, whose amplitude is controlled by an external signal; signal multiplication means 64, for producing an output signal whose value is proportional to the product of the values of the two input signals; and stable low pass and high pass filters 66 and 68 respectively, both of which may be passive. The amplitude control in 62 is conventional and may be slow compared to a cycle of frequency $f_2$. The output of low pass filter 66 is output signal 12, and the output of high pass filter 68 is amplitude signal 14'', which is input to envelope detection means 16''. Envelope detection means 16'' serves as the amplitude control means. While in this embodiment, the envelope detection means can be the conventional diode- capacitor-resistor combination, "envelope detection means" is also understood to include means appropriate to multicomponent signals. For example, envelope detection means could be a multiphase full wave rectifier followed by a low pass filter. (For a signal of frequency $a$ having $n$ components, the filter should pass frequencies lower than $2an$ and attenuate $2an$ and higher frequencies.)

It is to be understood that the combination of oscillators 60 and 62 and multiplier 64 meet the definition of oscillation means, wherein signals 12 and 14'' are jointly conveyed on a single wire.

In the embodiment of the invention shown in FIG. 3, oscillators 60 and 62 are set to frequencies $f_1$ and $f_2$, which are chosen so that the difference between $f_1$ and $f_2$ is $f$, the desired output frequency, and further so that $f_1$ and $f_2$ are each significantly greater than $f$. The outputs of oscillators 60 and 62 are multiplied together by signal multiplication means 64. By the well known trigonometric identity $(\cos A)(\cos B) = \frac{1}{2} \cos (A - B) + \frac{1}{2} \cos (A + B)$, the output of the multiplier is the sum of two signals having the same amplitude (which amplitude is proportional to the product of the amplitudes of the outputs of oscillators 60 and 62), one signal having the frequency $f_1 + f_2$, and the other having the desired output frequency, $f$. These two signals are separated by high pass filter 68 and low pass filter 66. Since the filters are stable, the amplitude of output signal 12 (which is the $f$ frequency output of filter 66) is proportional to the amplitude of the $f_1 + f_2$ frequency output of filter 68, which is the amplitude signal, 14''. The amplitude of the amplitude signal is detected by envelope detection means 16''. Even though the response of the envelope detection means may be slow compared with a cycle of the $f_1 + f_2$ frequency amplitude signal, it can be fast compared with a cycle of the $f$ frequency signal. Amplitude control signal 18, which is the output of envelope detection means 16'', is fed back to oscillator 62 to control the amplitude of the $f_2$ frequency signal, and hence, through multiplier 64 and filter 66, to control the amplitude of output signal 12. The $f_1 + f_2$ frequency amplitude signal is amplitude stabilized by the negative feedback loop and the $f$ frequency output signal is stabilized as a byproduct of the stabilization of the amplitude signal.

A third embodiment of the present invention comprises oscillation means which produces an amplitude signal having a plurality of components of various phase, but all of the same frequency as the output signal, and amplitude control means comprising envelope detection means for producing an amplitude control signal from the amplitude signal.

It is to be understood that the above-described arrangements are simply illustrative of the application of the principles of the invention. In the light of the above teachings, numerous other arrangements may be readily devised by those skilled in the art which will embody the principles of the invention and fall within the spirit and scope thereof.

What is claimed is:

1. A method for producing an output signal having a stabilized amplitude, comprising simultaneously generating said output signal and an amplitude signal in an oscillation means, said amplitude signal assuming values reporting the amplitude of said output signal at more than two instants in each cycle of said output signal; converting values of said amplitude signal, primarily from a period which is small and recent compared to a cycle of said output signal, to an amplitude control signal; and negatively feeding said amplitude control signal back to said oscillation means, thereby stabilizing the amplitude of said output signal.

2. A method in accordance with claim 1, wherein said amplitude signal continuously and at all instants assumes values reporting the amplitude of said output signal.

3. Signal generation means for producing a signal of specified amplitude, frequency, and waveform, in which stabilization of the second type is rapid compared with a cycle of said specified frequency, comprising amplitude control means and oscillation means, said oscillation means having input means for receiving an amplitude control signal and having output means for discharging an output signal and an amplitude signal, said output signal having said specified frequency and waveform and having an amplitude controlled by said amplitude control signal said amplitude signal assuming values reporting the amplitude of said output signal at more than two instants in each cycle of said output signal, said amplitude control means receiving said amplitude signal, producing said amplitude control signal primarily from values of the amplitude signal from a period which is small and recent compared to a cycle of said specified frequency, and negatively feeding said amplitude control signal back to said input means of said oscillation means, thereby causing the amplitude of said output signal to equal said specified amplitude.

4. Signal generation means in accordance with claim 3, wherein said oscillation means is so constructed and arranged that said amplitude signal continuously and at all instants assumes values reporting the amplitude of said output signal, and wherein said amplitude control means is so constructed and arranged that the value of said amplitude control signal at any instant essentially depends on the value of said amplitude signal at that instant.

5. Signal generation means in accordance with claim 4, wherein said oscillation means is so constructed and arranged that oscillation therefrom starts with the output signal at a specified phase.

6. Signal generation means in accordance with claim 4, wherein said oscillation means is so constructed and arranged that said output signal is sinusodial in waveform.

7. Signal generation means in accordance with claim 6, wherein said oscillation means is so constructed and arranged that oscillation therefrom starts with the output signal at a specified phase.

8. Signal generation means in accordance with claim 6, wherein said oscillation means is so constructed and arranged that said amplitude signal comprises two components which are sinusoidal in waveform and ninety degrees out of phase with each other, and wherein said amplitude control means includes squaring and summing means for squaring and summing said components and producing said amplitude control signal.

9. Signal generation means in accordance with claim 6, wherein said oscillation means comprises first and second integration means and inverting means connected in a ring, and damping control means connected to at least one of said integration means, thus producing two sinusoidal signal components having amplitudes controlled by said amplitude control signal.

10. Signal generation means in accordance with claim 3, wherein said oscillation means is so constructed and arranged that said output signal is sinusoidal in waveform.

11. Signal generation means in accordance with claim 3, wherein said amplitude control means includes envelope detection means for producing said amplitude control signal from said amplitude signal.

12. Signal generation means in accordance with claim 11, wherein said oscillation means is so constructed and arranged that said output signal is sinusoidal in waveform.

13. Signal generation means in accordance with claim 12, wherein said oscillation means includes first and second oscillators for producing first and second sinusoidal signals having first and second frequencies, respecively, said second oscillator having input means for receiving said amplitude control signal, said second signal having an amplitude controlled by said amplitude control signal; and further includes signal multiplication means for multiplying said first and second signals and producing a signal including said output signal and said amplitude signal, wherein said output signal has a frequency equal to the difference between said first and second frequencies, and said amplitude signal has a frequency equal to the sum of said first and second frequencies; and further includes filtering means for separating said output signal and said amplitude signal.

14. A method in accordance with claim 1, wherein said amplitude control signal at any instant is derived essentially from the value of said amplitude signal at that instant.

References Cited

UNITED STATES PATENTS

| | | | |
|---|---|---|---|
| 2,951,210 | 8/1960 | Robinson | 331—183 X |
| 3,137,825 | 6/1964 | Haner | 331—183 X |

ROY LAKE, *Primary Examiner.*

SIEGFRIED H. GRIMM, *Assistant Examiner.*

U.S. Cl. X.R.

331—135, 183